United States Patent
Chae et al.

(10) Patent No.: US 12,142,750 B2
(45) Date of Patent: Nov. 12, 2024

(54) METHOD OF PRODUCING NEGATIVE ELECTRODE FOR LITHIUM SECONDARY BATTERY

(71) Applicant: LG ENERGY SOLUTION, LTD., Seoul (KR)

(72) Inventors: Oh Byong Chae, Daejeon (KR); Sang Wook Woo, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 736 days.

(21) Appl. No.: 17/288,044

(22) PCT Filed: Oct. 24, 2019

(86) PCT No.: PCT/KR2019/014094
§ 371 (c)(1),
(2) Date: Apr. 23, 2021

(87) PCT Pub. No.: WO2020/085823
PCT Pub. Date: Apr. 30, 2020

(65) Prior Publication Data
US 2021/0384485 A1    Dec. 9, 2021

(30) Foreign Application Priority Data
Oct. 26, 2018  (KR) .................. 10-2018-0128789

(51) Int. Cl.
| | | |
|---|---|---|
| H01M 4/04 | (2006.01) | |
| H01M 4/139 | (2010.01) | |
| H01M 4/38 | (2006.01) | |
| H01M 10/058 | (2010.01) | |
| H01M 10/44 | (2006.01) | |
| H01M 4/02 | (2006.01) | |
| H01M 4/48 | (2010.01) | |
| H01M 4/587 | (2010.01) | |

(52) U.S. Cl.
CPC ....... *H01M 4/0445* (2013.01); *H01M 4/0404* (2013.01); *H01M 4/139* (2013.01); *H01M 4/382* (2013.01); *H01M 10/058* (2013.01); *H01M 10/446* (2013.01); *H01M 2004/027* (2013.01); *H01M 4/386* (2013.01); *H01M 4/48* (2013.01); *H01M 4/587* (2013.01)

(58) Field of Classification Search
None
See application file for complete search history.

(56) References Cited

U.S. PATENT DOCUMENTS

| | | | |
|---|---|---|---|
| 5,743,921 A | 4/1998 | Nazri et al. | |
| 11,799,085 B2 * | 10/2023 | Chae | H01M 4/0404 |
| 2012/0042490 A1 | 2/2012 | Lee et al. | |
| 2014/0310951 A1 | 10/2014 | Grant et al. | |
| 2015/0017543 A1 | 1/2015 | Lee et al. | |
| 2015/0364795 A1 | 12/2015 | Stefan et al. | |
| 2016/0141596 A1 | 5/2016 | Uhm et al. | |
| 2016/0181594 A1 | 6/2016 | Balogh et al. | |
| 2017/0338480 A1 | 11/2017 | Kim et al. | |
| 2018/0040914 A1 | 2/2018 | Grant et al. | |
| 2019/0036118 A1 | 1/2019 | Ofer et al. | |
| 2023/0117752 A1 | 4/2023 | Grant et al. | |

FOREIGN PATENT DOCUMENTS

| | | |
|---|---|---|
| CN | 104956522 A | 9/2015 |
| CN | 105845894 A | 8/2016 |
| CN | 105470465 B | 2/2018 |
| CN | 107749454 A | 3/2018 |
| CN | 109119593 A | 1/2019 |
| JP | 9-22690 A | 1/1997 |
| JP | 5402411 B2 | 1/2014 |
| JP | 5435469 B2 | 3/2014 |
| JP | 2017-130557 A | 7/2017 |
| JP | 2017-526106 A | 9/2017 |
| JP | 6294348 B2 | 3/2018 |
| KR | 10-1594784 B1 | 2/2016 |
| KR | 10-1783447 B1 | 10/2017 |
| KR | 10-1820463 B1 | 1/2018 |
| WO | WO 2017/139477 A1 | 8/2017 |

OTHER PUBLICATIONS

International Search Report for PCT/KR2019/014094 mailed on Feb. 3, 2020.

* cited by examiner

*Primary Examiner* — Laura Weiner
(74) *Attorney, Agent, or Firm* — Birch, Stewart, Kolasch & Birch, LLP

(57) ABSTRACT

A method of producing a negative electrode for a lithium secondary battery. The production method of the present invention includes a process of charging the negative electrode at a low current during pre-lithiation and a process of aging the negative electrode after the pre-lithiation for a sufficient time, thereby producing a negative electrode for a lithium secondary battery having excellent cycle performance.

12 Claims, No Drawings

METHOD OF PRODUCING NEGATIVE ELECTRODE FOR LITHIUM SECONDARY BATTERY

CROSS-REFERENCE TO RELATED APPLICATION

This application is based on and claims the benefit of priority to Korean Patent Application No. 10-2018-0128789, filed on Oct. 26, 2018 in the Korean Intellectual Property Office, the disclosure of which is incorporated herein in its entirety by reference.

TECHNICAL FIELD

The present invention relates to a method of producing a negative electrode for lithium secondary battery, and the production method of the present invention includes a process of charging the negative electrode at a low current during pre-lithiation and a process of aging the negative electrode after the pre-lithiation for a sufficient time, thereby producing a negative electrode for a lithium secondary battery having excellent cycle performance.

BACKGROUND ART

As technology development and a demand for a mobile device are increased, the demand for a secondary battery as an energy source is rapidly increased, and among the secondary batteries, a lithium secondary battery representing a high energy density and a high operation voltage, having a long cycle life, and having a low discharge rate is commercialized and widely used.

Meanwhile, metal oxides such as $LiCoO_2$, $LiMnO_2$, $LiMn_2O_4$, or $LiCrO_2$ are used as a positive electrode active material forming a positive electrode of the lithium secondary battery, and metal lithium, carbon-based materials such as graphite, or activated carbon, or materials such as silicon oxide ($SiO_x$) are used as a negative electrode active material forming a negative electrode. Among the negative electrode active materials, initially, metal lithium was mainly used, but as charge/discharge cycles proceed, a phenomenon in which a lithium element is grown on a surface of the metal lithium, so that the separator is damaged to destroy the battery, occurred, and thus, in recent years, a carbon-based material has been mainly used. However, since the carbon-based material has a disadvantage of having a small capacity of only about 400 mAh/g as a theoretical capacity, various studies for replacing the carbon-based material using a silicon (Si)-based material having a high theoretical capacity (4,200 mAh/g) as a negative electrode active material, have been conducted.

The lithium secondary battery is charged/discharged by repeating a process of intercalating a lithium ion of the positive electrode active material on the positive electrode in the negative electrode active material on the negative electrode and deintercalating the lithium ion.

Theoretically, lithium intercalation and deintercalation reactions in/from the negative electrode active material are completely reversible, but actually, more lithium is consumed than a theoretical capacity of the negative electrode active material, and only a part thereof is recovered during a discharge. Therefore, after a second cycle, a less amount of lithium ions are intercalated during a charge, but almost all intercalated lithium ion is deintercalated during a discharge. As such, a difference in a capacity between a first charge and a discharge reaction is referred to as an irreversible capacity loss, and since a commercialized lithium secondary battery is produced in the state in which lithium ions are supplied at a positive electrode and no lithium is at a negative electrode, it is important to minimize the irreversible capacity loss in the first charge and discharge.

The initial irreversible capacity loss is known as being mostly due to an electrolyte decomposition reaction on the surface of the negative electrode active material, and an SEI film (solid electrolyte interface) is formed on the surface of the negative electrode active material by an electrochemical reaction through the electrolyte decomposition. Though SEI film formation consumes many lithium ions to cause the irreversible capacity loss, the SEI film formed in an initial charge prevents a reaction of a lithium ion with a negative electrode or other materials during a charge/discharge and serves as an ion tunnel to have a function to pass only lithium ions, thereby suppressing a further electrolyte decomposition reaction and contributing a cycle characteristic improvement of a lithium secondary battery.

Accordingly, a method for improving initial irreversibility caused by formation of the SEI film or the like is needed, and as one method, there is a method of carrying out a pre-lithiation before manufacturing a lithium secondary battery to undergo a side reaction occurring in the first charge in advance. As such, in the case in which the pre-lithiation is carried out, when an actually produced secondary battery is charged/discharged, the battery undergoes the first cycle in the state of having a decreased irreversibility to that, thereby decreasing the initial irreversibility.

Examples of a conventional pre-lithiation method include a method of depositing lithium on a negative electrode, a method of bringing a negative electrode and lithium into direct contact with each other, and the like. For example, a lithiated material layer may be formed on a negative electrode active material layer for pre-lithiation, but the lithiated material is vulnerable to oxidation and easily oxidized when exposed to moisture or oxygen.

Therefore, a novel method of producing a negative electrode for a lithium secondary battery allowing more effective pre-lithiation is demanded.

RELATED ART DOCUMENT

Patent Document

JP5435469 B

DISCLOSURE OF INVENTION

Technical Problem

An aspect of the present invention provides a method of producing a negative electrode for a lithium secondary battery which prevents deterioration of cycle performance even after pre-lithiation of a negative electrode.

Technical Solution

According to the present invention, a method of producing a negative electrode for a secondary battery includes:
  forming a negative electrode active material layer on a surface of a negative electrode current collector to prepare a negative electrode;
  impregnating the negative electrode with a pre-lithiation solution;
  pre-lithiating the negative electrode by electrochemically charging the negative electrode using a lithium metal as a counter electrode while the negative electrode is impregnated with the pre-lithiation solution, to perform pre-lithiation; and aging the negative electrode after the pre-lithiation for 90 minutes to 41 hours, wherein the charging includes a low-current charging process performed at least once at a current intensity of 0.1 mA/cm² or more and 1 mA/cm² or less.

According to another exemplary embodiment of the present invention, a method of producing a lithium secondary battery including the method of producing a negative electrode for a lithium secondary battery, includes:

forming a negative electrode active material layer on a surface of a negative electrode current collector to prepare a negative electrode;

impregnating the negative electrode with a pre-lithiation solution;

performing a low-current charging process in which a lithium metal is used as a counter electrode while the negative electrode is impregnated with the pre-lithiation solution, to charge the negative electrode at a current intensity of 0.1 mA/cm² or more and 1 mA/cm² or less, at least once;

aging the negative electrode after the charge for 90 minutes to 41 hours, to produce a pre-lithiated negative electrode;

producing an electrode assembly including the pre-lithiated negative electrode, a positive electrode, and a separator and storing the electrode assembly in a battery container; and injecting an electrolyte solution into the battery container.

Advantageous Effects

According to the production method of the present invention, a process of charging a negative electrode at a low current during pre-lithiation and a process of aging the negative electrode after pre-lithiation for a sufficient time are included, thereby producing a negative electrode for a lithium secondary battery having excellent cycle performance.

Best Mode for Carrying Out the Invention

Hereinafter, the present invention will be described in detail.

Terms and words used in the present specification and claims are not to be construed as a general or dictionary meaning but are to be construed meaning and concepts meeting the technical ideas of the present invention based on a principle that the inventors can appropriately define the concepts of terms in order to describe their own inventions in best mode.

Method of Producing Negative Electrode

The present invention provides a method of producing a negative electrode for a secondary battery, including:

forming a negative electrode active material layer on a surface of a negative electrode current collector to prepare a negative electrode;

impregnating the negative electrode with a pre-lithiation solution;

electrochemically charging the negative electrode using a lithium metal as a counter electrode while the negative electrode is impregnated with the pre-lithiation solution, to perform pre-lithiation; and aging the negative electrode after the pre-lithiation for 90 minutes to 41 hours, wherein the charging includes a low-current charging process performed at a current intensity of 0.1 mA/cm² or more and 1 mA/cm² or less at least once.

The step of forming a negative electrode active material layer to prepare a negative electrode may be performed by dissolving or dispersing a negative electrode active material, a conductive material and/or a binder, and the like in a solvent to prepare a negative electrode slurry, and applying the negative electrode slurry to at least one surface of a negative electrode current collector and then pressing.

The negative electrode active material is a mixed negative electrode active material of a silicon-based negative electrode active material and a carbon-based negative electrode active material, in which a weight ratio of the silicon-based negative electrode active material to the carbon-based negative electrode active material may be 1:99 to 50:50, preferably 5:95 to 20:80.

When the silicon-based negative electrode active material is included at an amount less than the above range, it is difficult to increase an energy density, so that it may be difficult to achieve a high capacity of a battery, and when the silicon-based negative electrode active material is included at an amount more than the above range, a volume expansion degree of the negative electrode may be increased.

Meanwhile, the negative electrode current collector is not particularly limited as long as it has a high conductivity without causing a chemical change in a battery, and for example, copper, stainless steel, aluminum, nickel, titanium, baked carbon, copper or stainless steel which is surface-treated with carbon, nickel, titanium, silver, or the like, an aluminum-cadmium alloy, and the like may be used. In addition, the negative electrode current collector may have fine unevenness on the surface thereon to strengthen a binding force to the negative electrode active material, and for example, may be used in various forms of a film, a sheet, a foil, a net, a porous body, a foam, a nonwoven fabric body, and the like.

The negative electrode active material may be included at a content of 80 to 99 wt %, more specifically 85 to 98 wt %, with respect to a total weight of the negative electrode active material layer. When the negative electrode active material is included in the above range, it may exhibit an excellent capacity characteristic.

The conductive material is used for imparting conductivity to an electrode, and may be used without particular limitation as long as it has an electron conductivity without causing a chemical change in the configured battery. Specific examples thereof include graphites such as natural graphite or artificial graphite; carbon-based materials such as carbon black, acetylene black, ketjen black, channel black, furnace black, lamp black, thermal black, and carbon fiber; metal powder or metal fiber such as copper, nickel, aluminum, and silver; conductive whisker such as zinc oxide and potassium titanate; conductive metal oxides such as titanium oxide; conductive polymers such as a polyphenylene derivative, and the like, and these may be used alone or in combination of two or more. The conductive material may be included at 1 wt % to 30 wt %, with respect to the total weight of the negative electrode active material layer.

In addition, the binder serves to improve adhesion between negative electrode active material particles and an adhesive strength between the negative electrode active material and the current collector. Specific examples thereof include polyvinylidene fluoride (PVDF), vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), sulfonated-EPDM, styrene-butadiene rubber (SBR), fluorine rubber, various copolymers thereof, and the like, and these may be used alone or in combination of two or more. The binder may be included at 1 wt % to 30 wt %, with respect to the total weight of the negative electrode active material layer.

Meanwhile, a solvent used in preparation of the negative electrode slurry may be those commonly used in the art, and for example, dimethyl sulfoxide (DMSO), isopropyl alcohol, N-methylpyrrolidone (NMP), acetone, water, or the like may be used alone or in combination thereof. A use amount of the solvent may be appropriately adjusted considering a coating thickness, a preparation yield, a density, and the like of the slurry.

The pre-lithiation process may be performed by impregnating the negative electrode with a pre-lithiation solution and then electrochemically charging the negative electrode using a lithium metal as a counter electrode.

The pre-lithiation solution is a solution containing an ionizable lithium salt and an organic solvent and corresponds to a general electrolyte solution.

The ionizable lithium salt may include $Li^+$ as a cation, and one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$, as an anion.

The organic solvent may be one or more selected from cyclic carbonate-based organic solvents selected from the group consisting of ethylene carbonate, 1,2-butylene carbonate, 2,3-butylene carbonate, 1,2-pentylene carbonate, 2,3-pentylene carbonate, vinylene carbonate, and fluoroethylene carbonate (FEC); linear carbonate-based organic solvents selected from the group consisting of dimethyl carbonate, diethyl carbonate, dipropyl carbonate, ethyl methyl carbonate, methyl propyl carbonate, and ethyl propyl carbonate; and linear ester-based organic solvents selected from the group consisting of methyl acetate, ethyl acetate, propyl acetate, methyl propionate, ethyl propionate, propyl propionate, and butyl propionate.

The impregnation may be performed at a temperature of 10° C. to 200° C. for 2 hours to 48 hours, preferably at a temperature of 20° C. to 70° C. for 2 hours to 36 hours.

When the impregnation temperature and the time is lower than 10° C. and less than 2 hours, pre-lithiation may not be sufficiently performed, when the temperature is higher than 200° C., a lithium metal is dissolved so that it is difficult to maintain the shape, and when the time is 48 hours, pre-lithiation is sufficiently performed, so that it is not necessary to impregnate the negative electrode.

In the method of producing a negative electrode of the present invention, the charge for pre-lithiation is characterized by including a low-current charging process performed at a current intensity of 0.1 mA/cm² or more and 1 mA/cm² or less at least once.

Specifically, the charge for pre-lithiation may be performed by combining a low-current charging process performed at a current intensity of 0.1 mA/cm² or more and 1 mA/cm² or less and a high-current charging process performed at a current intensity of more than 1 mA/cm² and 5 mA/cm² or less, at least once, respectively, and a step of allowing the negative electrode to stand for 5 minutes to 10 hours between the low-current charging process and the high-current charging process may be included. Accordingly, the charge for pre-lithiation may include the low-current charging process, the high-current charging process, and the standing process performed between the low-current charging process and the high-current charging process, at least once, respectively. Here, when the standing time is less than 5 minutes, lithium which is pre-lithiated and diffused to a negative electrode may not be uniformly distributed in the negative electrode, and when the standing time is more than 10 hours, a process time is too extended and lithium which is pre-lithiated and diffused in the negative electrode may be consumed.

In the charge of the present invention, the low-current charging process performed at a current intensity of 0.1 mA/cm² or more and 1 mA/cm² or less may be performed only once, but after performing the low-current charging process as such, the high-current charging process performed at a current intensity of more than a 1 mA/cm² and 5 mA/cm² or less may be performed.

In addition, as another exemplary embodiment of the charge, the low-current charging process performed at a current intensity of the 0.1 mA/cm² or more and 1 mA/cm² or less, the high-current charging process performed at a current intensity of more than a 1 mA/cm² and 5 mA/cm² or less, and then the low-current charging process performed at a current intensity of 0.1 mA/cm² or more and 1 mA/cm² or less may be performed.

In addition, as another exemplary embodiment of the charge, the high-current charging process performed at a current intensity of more than 1 mA/cm² and 5 mA/cm² or less and then the low-current charging process performed at a current intensity of 0.1 mA/cm² or more and 1 mA/cm² or less may be performed.

When the current intensity of the low-current charge is less than 0.1 mA/cm², a current is too low so that a side reaction is severe, and when the current intensity is more than 1 mA/cm², it may be difficult to form a stable SEI film. The low-current charge may be performed at a current intensity of specifically 0.3 mA/cm² or more and 0.7 mA/cm² or less.

The low-current charge may be performed at a 10% to 80%, preferably 30% to 70% state of charge of a pre-lithiation charge amount (pre-lithiation capacity), when the charge amount is a combined amount charged in the entire low-current charging process, in which the negative electrode is charged at less than 10% of the pre-lithiation charge amount, it is difficult to form a stable SEI film, and when charged at more than 80%, products due to a side reaction may be much produced on the surface of the negative electrode. "Performed at a 10% to 80% state of charge of a pre-lithiation charge amount, when the charge amount is a combined amount charged in the entire low-current charging process" means that when the low-current charging process is performed at least twice, the low-current charging process is performed at a 10% to 80% state of charge of the pre-lithiation charge amount when the charge amount is a combined amount charged in the entire low-current charging process performed at least twice.

In the present specification, a "pre-lithiation charge amount" means an electrochemical charge amount of a negative electrode required for pre-lithiation, and specifically means a 5% to 50%, preferably 15% to 35% state of charge (SOC) of the negative electrode. When the negative electrode is electrochemically charged to the above-described range to perform pre-lithiation, a passivation film may be uniformly and stably formed on the surface of a negative electrode structure to improve a battery reversible capacity, and accordingly, the cycle characteristic of the battery may be improved, which is thus preferred.

When the current intensity of the high-current charge is 1 mA/cm$^2$ or less, an SEI side reaction product is increased, and when the current intensity is more than 5 mA/cm$^2$, it is difficult for uniform pre-lithiation to occur. The high-current charge may be performed at a current intensity of specifically 1.5 mA/cm$^2$ or more and 3.5 mA/cm$^2$ or less.

The high-current charge may be performed at a 20% to 90%, preferably 30% to 70% state of charge of a pre-lithiation charge amount, when the charge amount is a combined amount charged in the entire high-current charging process, when the negative electrode is charged at less than 20% of the pre-lithiation charge amount, a side reaction product is increased on the surface of the negative electrode, and when charged at more than 90%, it may be difficult to form a stable SEI film. "Performed at a 20% to 90% state of charge of a pre-lithiation charge amount, when the charge amount is a combined amount charged in the entire high-current charging process" means that when the high-current charging process is performed at least twice, the high-current charging process is performed at a 20% to 90% state of charge of the pre-lithiation charge amount when the charge amount is a combined amount charged in the entire high-current charging process performed at least twice.

Meanwhile, the negative electrode after pre-lithiation in the production of a negative electrode of the present invention may be aged or allowed to stand for 90 minutes to 41 hours, specifically 2 hours to 24 hours. When an aging time is less than 90 minutes, a stable polymer coating film may not be formed on the surface of the negative electrode, and also a distribution of lithium ions in the negative electrode is not uniform, and a concentration of lithium ions may be increased at a specific portion to decrease oxidation stability. In addition, when the aging time is more than 41 hours, lithium which is pre-lithiated and diffused to the negative electrode is consumed by a side reaction with an electrolyte solution on the surface of the negative electrode, so that a pre-lithiation effect may be deteriorated by the amount of consumed lithium.

In the present specification, a negative electrode after pre-lithiation may refer to a negative electrode in which the electrochemical charge is completed to a desired level. For example, when the electrochemical charge includes the low-current charging process, the high-current charging process, and the standing process performed between the low-current charging process and the high-current charging process, at least once, respectively, the negative electrode after the pre-lithiation may refer to a negative electrode in which pre-lithiation is completed to a desired level by performing the low-current charging process, the high-current charging process, and the standing process.

Method of Producing Lithium Secondary Battery

In the present invention, a method of producing a lithium secondary battery including a method of producing a negative electrode for a lithium secondary battery described above is provided.

For example, the method of producing a lithium secondary battery of the present invention includes:
 forming a negative electrode active material layer on a negative electrode current collector to prepare a negative electrode;
 impregnating the negative electrode with a pre-lithiation solution;
 performing a low-current charging process in which a lithium metal is used as a counter electrode while the negative electrode is impregnated with the pre-lithiation solution, to charge the negative electrode at a current intensity of 0.1 mA/cm$^2$ or more and 1 mA/cm$^2$ or less, at least once;
 aging the negative electrode after the charge for 90 minutes to 41 hours, to produce a pre-lithiated negative electrode;
 producing an electrode assembly including the pre-lithiated negative electrode, a positive electrode, and a separator and storing the electrode assembly in a battery container; and
 injecting an electrolyte solution into the battery container.

The lithium secondary battery may be produced according to a common method of producing a secondary battery, except that a negative electrode is produced by the production method of the present invention and used.

In the secondary battery, the positive electrode includes a positive electrode current collector and a positive electrode active material layer disposed on at least one surface of the positive electrode current collector.

The positive electrode may be produced according to a common method of producing a positive electrode which is commonly known in the art. For example, the positive electrode may be produced by a method of dissolving or dispersing components forming a positive electrode active material layer, that is, a positive electrode active material, a conductive material and/or a binder, and the like in a solvent to prepare a positive electrode slurry, applying the positive electrode slurry to at least one surface of the positive electrode current collector, and then drying and pressing, or by casting the positive electrode slurry on a separate support, and peeling off a film from the support to obtain the film, which is then laminated on the positive electrode current collector.

The positive electrode current collector is not particularly limited as long as it has a conductivity without causing a chemical change in a battery, and for example, stainless steel, aluminum, nickel, titanium, baked carbon, or aluminum or stainless steel which is surface-treated with carbon, nickel, titanium, silver, or the like, and the like may be used. In addition, the positive electrode current collector may have a thickness of 3 μm to 500 μm, and fine unevenness may be formed on the surface of the current collector to increase an adhesive strength to the positive electrode active material. For example, various forms such as a film, a sheet, a foil, a net, a porous body, foam, and a nonwoven fabric body may be used.

As the positive electrode active material, layered compounds or compounds substituted with one or more transition metals such as lithium cobalt oxide (LiCoC$_2$) and lithium nickel oxide (LiNiO$_2$); lithium manganese oxides represented by the chemical formulae Li$_{1+y}$Mn$_{2-y}$O$_4$ (wherein y is 0 to 0.33), LiMnO$_3$, LiMn$_2$O$_3$, and LiMnO$_2$; lithium copper oxide (Li$_2$CuO$_2$); vanadium oxides such as LiV$_3$O$_8$, LiFe$_3$O$_4$, V$_2$O$_5$, and Cu$_2$V$_2$O$_7$; Ni-site type lithium nickel oxides represented by the chemical formula LiNi$_{1-y}$M$_y$O$_2$ (wherein M=Co, Mn, Al, Cu, Fe, Mg, B, or Ga, and y=0.01 to 0.3); lithium manganese composite oxides represented by the Chemical Formula LiMn$_{2-y}$M$_y$O$_2$ (wherein M=Co, Ni, Fe, Cr, Zn, or Ta, and y=0.01 to 0.1) or Li$_2$Mn$_3$MO$_8$ (wherein M=Fe, Co, Ni, Cu, or Zn); LiMn$_2$O$_4$ in which Li is partly substituted with an alkali earth-metal ion; disulfide compounds; Fe$_2$(MoO$_4$)$_3$, and the like may be used, but is not limited thereto.

In addition, the binder and the conductive material may be the same as described above for the negative electrode.

Meanwhile, in the secondary battery, a separator separates the negative electrode and the positive electrode and provides a transport passage of lithium ions, and any separator may be used without particular limitation as long as it is usually used as a separator in a secondary battery. In particular, a separator having a low resistance to ion transport of an electrolyte and excellent electrolyte solution impregnation ability, is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more films thereof, may be used. In addition, a common porous nonwoven fabric, for example, a nonwoven fabric made of a glass fiber having a high melting point, a polyethylene terephthalate fiber and the like may be used. In addition, a coated separator containing a ceramic component or a polymer material for securing thermal resistance or mechanical strength may be used, selectively as a monolayer or multilayer structure.

Meanwhile, the electrolyte solution may include an organic solvent and a lithium salt.

As the organic solvent, any organic solvent may be used without particular limitation as long as it may serve as a medium in which ions involved in the electrochemical reaction of a battery may move. Specifically, as the organic solvent, ester-based solvents such as methyl acetate, ethyl acetate, γ-butyrolactone, and ε-caprolactone; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as Ra-CN (Ra is a linear, branched, or cyclic hydrocarbon group having 2 to 20 carbon atoms, and may include a double bond, aromatic ring or an ether bond); amides such as dimethylformamide; dioxolane such as 1,3-dioxolane; or sulfolanes, and the like may be used. Among these, a carbonate-based solvent is preferred, and a mixture of cyclic carbonate having a high ion conductivity and a high dielectric constant to increase charge/discharge performance of a battery (for example, ethylene carbonate, propylene carbonate, or the like) and a linear carbonate-based compound having a low viscosity (for example, ethyl methyl carbonate, dimethyl carbonate, diethyl carbonate, or the like) is more preferred. In this case, when the cyclic carbonate and the linear carbonate are mixed at a volume of about 1:1 and used, electrolyte solution performance may be excellent.

The lithium salt may be used without particular limitation as long as it is a compound capable of providing a lithium ion used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. It is preferred that a concentration of the lithium salt may be in a range of 0.1 M to 2.0 M. When the lithium salt concentration is within the range, the electrolyte solution has appropriate conductivity and viscosity, so that electrolyte performance may be excellent and lithium ions may effectively move.

The electrolyte solution may further include, for example haloalkylene carbonate compounds such as difluoroethylene carbonate; or one or more additives such as pyridine, triethylphosphite, triethanolamine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, or aluminum trichloride, for improving a life characteristic of a battery, suppressing a decrease in a battery capacity, improving a discharge capacity of a battery, and the like, in addition to the components of the electrolyte solution. Here, the additive may be included at 0.1 wt % to 5 wt %, with respect to the total weight of the electrolyte solution.

EXAMPLE

Hereinafter, the present invention will be described in detail by Examples. However, the following Examples are only illustrative of the present invention, and do not limit the scope of the present invention.

Example 1

Production of Negative Electrode 92 wt % of a negative electrode active material (graphite: SiO=7:3), 3 wt % of a conductive material (Denka black), 3.5 wt % of a binder (SBR), and 1.5 wt % of a thickener (CMC) were added to water to prepare a negative electrode active material slurry.

One surface of a copper current collector was coated with the thus-prepared negative electrode active material slurry, which was dried and rolled to produce a negative electrode.

Electrochemical Charge and Pre-Lithiation 2 wt % of fluoroethylene carbonate (FEC) was added to a solvent in which ethylene carbonate (EC) and ethyl methyl carbonate (EMC) were mixed at a volume ratio of 3:7, and $LiPF_6$ was dissolved therein so that the concentration is 1 M to prepare a pre-lithiation solution.

The negative electrode produced above was cut into a size of 10 cm×10 cm, wetted in the pre-lithiation solution at a temperature of 25° C. for 3 hours, and then electrochemically charged using a lithium metal as a counter electrode while the pre-lithiation solution is present, to pre-lithiate the negative electrode.

Here, the pre-lithiation process was performed as follows:

[Charging at a current intensity of 0.5 $mA/cm^2$ for 30 minutes (performing 25% of pre-lithiation charge amount)→standing for 10 minutes→charging at a current intensity of 2.5 $mA/cm^2$ for 12 minutes (performing 50% of pre-lithiation charge amount)→standing for 10 minutes→charging at a current intensity of 0.5 $mA/cm^2$ for 30 minutes (performing 25% of pre-lithiation charge amount)→aging for 3 hours]

Here, the pre-lithiation charge amount was set as 25% state of charge (SOC) of the negative electrode.

The negative electrode after pre-lithiation by the process as described above was washed using EMC and dried at room temperature to produce a pre-lithiated negative electrode.

Production of Lithium Secondary Battery

A polyolefin separator was interposed between the pre-lithiated negative electrode produced above and a $LiCoO_2$ positive electrode, FEC was added at 1 wt % to a solvent in which EC and EMC were mixed at a volume ratio of 3:7, and an electrolyte solution in which $LiPF_6$ was dissolved at a concentration of 1 M was injected thereinto to produce a coin type full-cell.

Example 2

The process was performed in the same manner as in Example 1, except that the pre-lithiation process was performed as follows.

[Charging at a current intensity of 0.5 mA/cm² for 60 minutes (performing 50% of pre-lithiation charge amount)→standing for 10 minutes→charging at a current intensity of 2.5 mA/cm² for 12 minutes (performing 50% of pre-lithiation charge amount)→aging for 3 hours]

Example 3

The process was performed in the same manner as in Example 1, except that the pre-lithiation process was performed as follows.

[Charging at a current intensity of 2.5 mA/cm² for 12 minutes (performing 50% of pre-lithiation charge amount)→standing for 10 minutes→charging at a current intensity of 0.5 mA/cm² for 60 minutes (performing 50% of pre-lithiation charge amount)→aging for 3 hours]

Example 4

The process was performed in the same manner as in Example 1, except that the pre-lithiation process was performed as follows.

[Charging at a current intensity of 0.5 mA/cm² for 120 minutes (performing 100% of pre-lithiation charge amount)→aging for 3 hours]

Comparative Example 1

The process was performed in the same manner as in Example 1, except that the pre-lithiation process was performed as follows.

[Charging at a current intensity of 2.5 mA/cm² for 24 minutes (performing 100% of pre-lithiation charge amount)→aging for 3 hours]

Comparative Example 2

The process was performed in the same manner as in Example 1, except that the pre-lithiation process was performed as follows.

[Charging at a current intensity of 0.5 mA/cm² for 30 minutes (performing 25% of pre-lithiation charge amount)→standing for 10 minutes→charging at a current intensity of 2.5 mA/cm² for 12 minutes (performing 50% of pre-lithiation charge amount)→standing for 10 minutes→charging at a current intensity of 0.5 mA/cm² for 30 minutes (performing 25% of pre-lithiation charge amount)→aging for 10 minutes]

Comparative Example 3

The process was performed in the same manner as in Example 1, except that the pre-lithiation process was performed as follows.

[Charging at a current intensity of 0.5 mA/cm² for 30 minutes (performing 25% of pre-lithiation charge amount)→standing for 10 minutes→charging at a current intensity of 2.5 mA/cm² for 12 minutes (performing 50% of pre-lithiation charge amount)→standing for 10 minutes→charging at a current intensity of 0.5 mA/cm² for 30 minutes (performing 25% of pre-lithiation charge amount)→aging for 80 hours]

Experimental Example 1. Cycle Charge/Discharge experiment

A reversibility test was performed on the coin type full-cells produced in the Examples and Comparative Examples, using an electrochemical charger/discharger. During charge, the cell was charged by applying a current at a current density of 0.1C-rate to a voltage of 4.2 V (vs. Li/Li⁺), and during discharge, the cell was discharged at the same current density to a voltage of 2.5 V. A 100 cycle capacity retention rate as compared with a first cycle discharge capacity is shown in the following Table 1:

TABLE 1

| | Example 1 | Example 2 | Example 3 | Example 4 | Comparative Example 1 | Comparative Example 2 | Comparative Example 3 |
|---|---|---|---|---|---|---|---|
| 100 cycle capacity retention rate (%) | 93 | 91 | 92 | 89 | 84 | 81 | 79 |

Examples 1 to 3 included a low-current (0.5 mA/cm²) charging process together with a high-current (2.5 mA/cm²) charging process, during the pre-lithiation process, thereby forming a stable polymer coating film on the surface of the negative electrode, and the cell was sufficiently aged after the pre-lithiation (aged for 3 hours), whereby a lithium concentration was uniformly distributed in the electrode so that the electrode has oxidation stability. Accordingly, the cell produced using the thus-produced negative electrode showed excellent cycle performance as shown in Table 1.

Meanwhile, in Example 4 in which the high-current charging process was not included and only the low-current (0.5 mA/cm²) charging process once was included, a charging time was long and an electrolyte solution side reaction product remained much on the surface of the negative electrode to increase cell resistance, and thus, the cycle performance was a little deteriorated as compared with Examples 1 to 3.

However, in Comparative Example 1 in which the low-current (0.5 mA/cm²) charging process was omitted or in Comparative Example 2 in which the cell was not aged for a sufficient time after the pre-lithiation, a stable polymer coating film was not formed on the surface of the negative electrode, lithium ions were not uniformly distributed in the electrode, and the lithium ion concentration was high at a specific portion so that oxidation stability was deteriorated.

Accordingly, the cell produced with the negative electrode has deteriorated cycle performance.

In addition, when the cell was allowed to stand in an electrolyte solution for too long time after pre-lithiation, as in Comparative Example 3, lithium which was pre-lithiated and entered into the negative electrode was consumed by a side reaction with the electrolyte solution on the surface of the negative electrode. The effect of the pre-lithiation was deteriorated by the lithium consumed to deteriorate cycle performance.

The invention claimed is:

1. A method of producing a negative electrode for a secondary battery, the method comprising:
    forming a negative electrode active material layer on a surface of a negative electrode current collector to prepare a negative electrode;
    impregnating the negative electrode with a pre-lithiation solution;
    pre-lithiating the negative electrode by electrochemically charging the negative electrode using a lithium metal as a counter electrode while the negative electrode is impregnated with the pre-lithiation solution; and
    allowing the negative electrode to stand after the pre-lithiation for 90 minutes to 41 hours,
    wherein the negative electrode active material layer comprises a negative electrode active material comprising a silicon-based negative electrode material and a carbon-based negative electrode active material,
    wherein a weight ratio of the silicon-based negative electrode active material to the carbon-based negative electrode active material is 1:99 to 50:50, and
    wherein the charging comprises a low-current charging process performed at least once at a current intensity of 0.1 mA/cm$^2$ or more and 1 mA/cm$^2$ or less.

2. The method of producing the negative electrode for the secondary battery according to claim 1, wherein the charging is performed by combining the low-current charging process performed at a current intensity of 0.1 mA/cm$^2$ or more and 1 mA/cm$^2$ or less and a high-current charging process performed at a current intensity of more than 1 mA/cm$^2$ and 5 mA/cm$^2$ or less, at least once, respectively.

3. The method of producing the negative electrode for the secondary battery according to claim 2, further comprising: allowing the negative electrode to stand for 5 minutes to 10 hours between the low-current charging process and the high-current charging process.

4. The method of producing the negative electrode for the secondary battery according to claim 2, wherein the high-current charging is performed at a current intensity of 1.5 mA/cm$^2$ or more and 3.5 mA/cm$^2$ or less.

5. The method of producing the negative electrode for the secondary battery according to claim 2, wherein the high-current charging is performed at a 20% to 90% state of charge of a pre-lithiation charge amount, when the charge amount is a combined amount charged in the entire high-current charging process.

6. The method of producing the negative electrode for the secondary battery according to claim 1, wherein the charging comprises performing the low-current charging process at a current intensity of 0.1 mA/cm$^2$ or more and 1 mA/cm$^2$ or less and then a high-current charging process at a current intensity of more than a 1 mA/cm$^2$ and 5 mA/cm$^2$ or less.

7. The method of producing the negative electrode for the secondary battery according to claim 1, wherein the charging comprises performing the low-current charging process at a current intensity of 0.1 mA/cm$^2$ or more and 1 mA/cm$^2$ or less, a high-current charging process at a current intensity of more than a 1 mA/cm$^2$ and 5 mA/cm$^2$ or less, and then the low-current charging process at a current intensity of 0.1 mA/cm$^2$ or more and 1 mA/cm$^2$ or less.

8. The method of producing the negative electrode for the secondary battery according to claim 1, wherein the charging comprises performing a high-current charging process at a current intensity of more than 1 mA/cm$^2$ and 5 mA/cm$^2$ or less and then the low-current charging process at a current intensity of 0.1 mA/cm$^2$ or more and 1 mA/cm$^2$ or less.

9. The method of producing the negative electrode for the secondary battery according to claim 1, wherein the low-current charging is performed at a current intensity of 0.3 mA/cm$^2$ or more and 0.7 mA/cm$^2$ or less.

10. The method of producing the negative electrode for the secondary battery according to claim 1, wherein the low-current charging is performed at a 10% to 80% state of charge of a pre-lithiation charge amount, when the charge amount is a combined amount charged in the entire low-current charging process.

11. The method of producing a negative electrode for a secondary battery according to claim 1, wherein the impregnating step is performed at a temperature of 10° C. to 200° C. for 2 hours to 48 hours.

12. A method of producing a lithium secondary battery, the method comprising the steps of:
    forming a negative electrode active material layer on a surface of a negative electrode current collector to prepare a negative electrode;
    impregnating the negative electrode with a pre-lithiation solution;
    performing a low-current charging process wherein a lithium metal is used as a counter electrode while the negative electrode is impregnated with the pre-lithiation solution, to charge the negative electrode at a current intensity of 0.1 mA/cm$^2$ or more and 1 mA/cm$^2$ or less, at least once;
    allowing the negative electrode to stand after the charging process for 90 minutes to 41 hours, to produce a pre-lithiated negative electrode;
    producing a lithium secondary battery comprising an electrode assembly comprising the pre-lithiated negative electrode, a positive electrode, and a separator and storing the electrode assembly in a battery container; and
    injecting an electrolyte solution into the battery container to produce a lithium secondary battery,
    wherein the negative electrode active material layer comprises a negative electrode active material comprising a silicon-based negative electrode material and a carbon-based negative electrode active material, and
    wherein a weight ratio of the silicon-based negative electrode active material to the carbon-based negative electrode active material is 1:99 to 50:50.

* * * * *